United States Patent [19]

Shim

[11] Patent Number: 5,822,552
[45] Date of Patent: Oct. 13, 1998

[54] METHOD AND CIRCUIT FOR REARRANGING OUTPUT DATA IN VARIABLE-LENGTH DECODER

[75] Inventor: Dae-yun Shim, Seoul, Rep. of Korea

[73] Assignee: Samsung Electronics Co., Ltd., Kyungki-do, Rep. of Korea

[21] Appl. No.: 581,374

[22] Filed: Dec. 29, 1995

[30] Foreign Application Priority Data

Oct. 13, 1995 [KR] Rep. of Korea ............... 95-35370

[51] Int. Cl.$^6$ .................................................. G06F 13/00
[52] U.S. Cl. ........................................... 395/309; 348/461
[58] Field of Search ........................... 395/309; 348/461, 348/401, 426

[56] References Cited

U.S. PATENT DOCUMENTS

| | | | |
|---|---|---|---|
| 5,426,462 | 6/1995 | Bui | 348/401 |
| 5,502,493 | 3/1996 | Meyer | 348/426 |
| 5,515,106 | 5/1996 | Chaney et al. | 348/461 |
| 5,557,271 | 9/1996 | Rim et al. | 341/67 |
| 5,579,052 | 11/1996 | Artieri | 348/416 |
| 5,592,399 | 1/1997 | Keith et al. | 364/514.2 |

*Primary Examiner*—Jack B. Harvey
*Assistant Examiner*—David A. Wiley

*Attorney, Agent, or Firm*—Sughrue, Mion, Zinn, Macpeak & Seas, PLLC

[57] ABSTRACT

The invention relates to a method and a circuit for rearranging output data of a variable-length decoder (VLD). The circuit for rearranging output data of a VLD has an internal memory, a first data processor for packing a variable-length decoded bit stream in a data unit having a predetermined number or bits, generating a write address for each packed data unit to store the packed data unit in the internal memory, and generating a request signal for transmitting the stored packed data unit to an external memory, when the number of packed data units stored in the internal memory exceeds a predetermined threshold value, and a second data processor for generating respective read addresses for reading out N packed data units from the internal memory, when an accept signal is generated in response to the request signal, and applying the generated read address to the internal memory, wherein the N packed data units stored in the corresponding read address are sequentially read out from the internal memory and are transmitted to the external memory. Therefore, timing margins can be ensured through request and acceptance, and an automatic byte-alignment by start code is possible. Further, memory writing and reading timing is stabilized, and write and read banks of the memory are efficiently switched during writing and reading operations.

14 Claims, 6 Drawing Sheets

METHOD AND CIRCUIT FOR REARRANGING OUTPUT DATA IN VARIABLE-LENGTH DECODER

BACKGROUND OF THE INVENTION

1. Field of the Invention

The present invention relates to a device for compressing and recovering an image. More particularly, it relates to a method and a circuit for rearranging output data of a variable-length decoder where, when variable-length decoded bit streams packed into 64-bit units are recorded in a memory up to a predetermined capacity, 8 units of the packed data are read out from the memory while in a high-speed page mode.

2. Description of Related Art

As the amount of information processed in data storage and retrieval systems and image processors, traditionally analog in nature, becomes greater due to conversion to digital modes, the amount of information should be reduced (compressed) in order to efficiently use storage media and transmission channels. The Moving Picture Expert Group (MPEG) has agreed on standards for achieving this. According to a general compression method of an MPEG-encoded bit stream, i.e., variable-length encoding, repetitive (redundant) information is removed using time and spacial correlations of the image information.

Here, a variable-length encoder in the image compression apparatus allocates a shorter code to those symbols which occur more frequently. In order to restore the variable-length-compressed signal back into its original form the encoded image signal is applied to an image restoring apparatus comprising a variable-length decoder (VLD) to perform the restoration. Accordingly, the VLD controls an external memory to read the shorter codes slowly and the longer codes quickly, by generating a request signal and providing the request signal to the external memory in a timely manner. Accordingly, whenever the request signal is received from the VLD, the external memory sends the data to the VLD immediately, regardless of code length.

However, the external memory stores many kinds of data to be accessed and when a request signal of higher priority is received from elsewhere in the system, the request signal from the variable-length decoder must stand by. During this brief waiting period the image compressing/restoring process is unavoidably interrupted since the VLD is directly connected to the external memory, with no interface circuitry.

SUMMARY OF THE INVENTION

It is an object of the present invention to provide in an image compressing and recovering apparatus a method and a circuit for rearranging output data of a VLD, where a variable-length decoded bit stream is packed into units of 64 bits, in which 8 units of packed data are transmitted to an external memory while in a high-speed page mode by using a request signal and an accept signal, and variable-length decoded output data is thereby rearranged.

To achieve the above object, there is provided a method for rearranging output data of a VLD, comprising the steps of:

(a) packing a variable-length decoded bit stream into a packed data unit having a predetermined number of bits, generating a write address for each packed data unit, and storing the packed data unit in the corresponding write address of an internal memory;

(b) generating a request signal for transmitting the stored packed data unit to an external memory, when the number of packed data units stored in the internal memory exceeds a predetermined threshold value;

(c) generating a respective read address for reading out N packed data units from the internal memory, when an accept signal is generated in response to the request signal; and (d) sequentially reading out the N packed data units stored in respective read addresses from the internal memory, and transmitting the read out data units to the external memory.

To achieve the above object, there is provided a circuit for rearranging output data of a VLD, comprising:

an internal memory;

a first data processor for packing a variable-length decoded bit stream into a packed data unit having a predetermined number of bits, generating a write address for each packed data unit to store the packed data unit in the internal memory, and generating a request signal for transmitting the stored packed data unit to an external memory, when the number of packed data units stored in the internal memory exceeds a predetermined threshold value; and a second data processor for generating respective read addresses for reading out N packed data units from the internal memory when an accept signal is generated in response to the request signal and applying the generated read address to the internal memory, wherein the N packed data units stored in the corresponding read address are sequentially read out from the internal memory and the read-out packed data units are transmitted to the external memory.

BRIEF DESCRIPTION OF THE DRAWINGS

The above object and advantages of the present invention will become more apparent by describing in detail a preferred embodiment thereof with reference to the attached drawings in which:

FIGS. 5A–5K are operational timing diagrams of the second data processing unit shown in FIG. 4;

FIGS. 7A–7H are operational timing diagrams of the memory unit shown in FIG. 6.

DETAILED DESCRIPTION OF THE INVENTION

The present invention is described below in detail, referring to the attached drawings.

Figure 1:
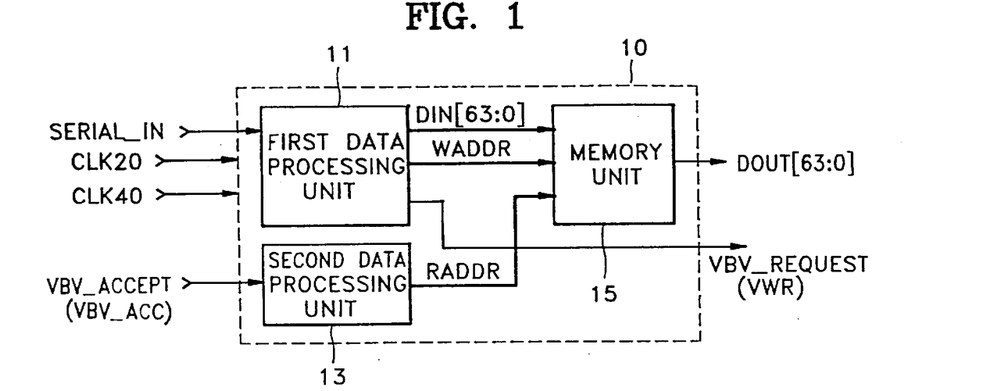
FIG. 1 is a block diagram of a circuit for rearranging output data of a variable-length decoder, according to the present invention.

FIG. 1 is a block diagram of a circuit 10 for rearranging output data in a VLD, according to the present invention. As shown, circuit 10 is comprised of an internal memory unit 15, a first data processing unit 11 for packing a variable-length decoded serial-bit stream into a unit of packed data of a predetermined number of bits, for example, into a unit of 64 bits, generating a write address WADDR for each unit of packed data to store the packed data in internal memory unit 15, and generating a request signal VWR for transmitting the stored unit of packed data to an external memory (not shown) during a high-speed page mode, when the unit of packed data stored in internal memory unit 15 exceeds a predetermined threshold value, for example, half of the capacity of the internal memory unit 15. Circuit 10 also includes a second data processing unit 13 for generating a read address RADDR for reading each of N units of packed data, for example, 8 units of packed data, from internal memory unit 15, when an accept signal VBV—ACC is generated in response to the request signal, and applying the read address RADDR to internal memory unit 15. At this time, the N units of packed data stored in the corresponding read addresses are sequentially read out from internal memory unit 15 and transmitted to the external memory.

Here, a first-in first-out (FIFO) memory having 64 bits×16 words, or a RAM may be used as internal memory unit 15.

Figure 2:
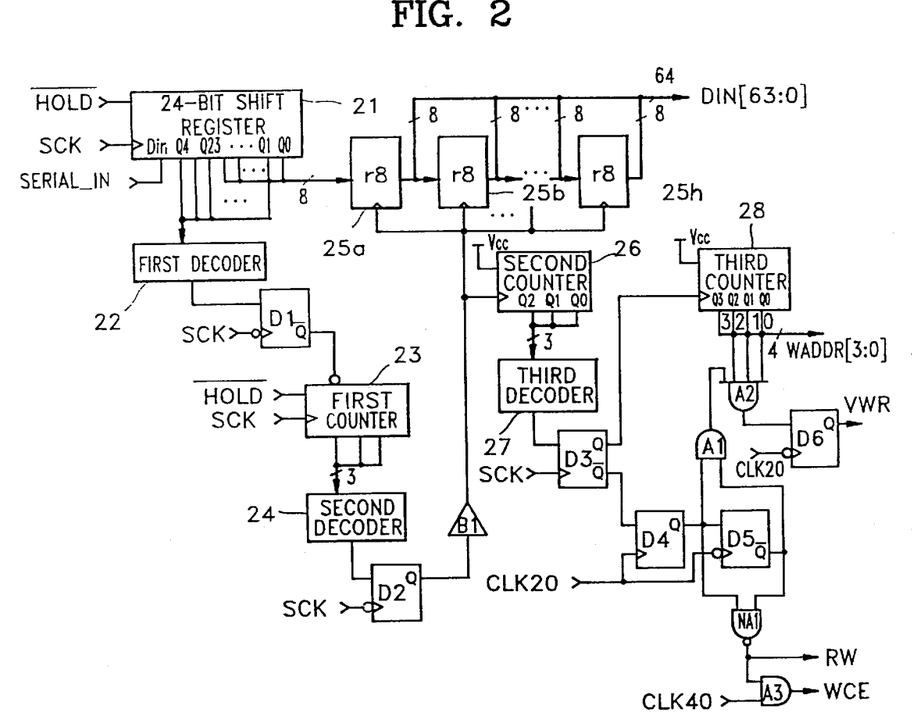
FIG. 2 is a detailed circuit diagram of the first data processing unit shown in FIG. 1.

FIG. 2 is a detailed circuit diagram of first data processing unit 11 shown in FIG. 1. As shown, first data processing unit 11 includes a 24-bit shift register 21, first through third decoders 22, 24 and 27, first through third counters 23, 26 and 28, six D-flip flops D1–D6, a buffer B1, eight 8-bit shift registers 25a–25h, three AND gates A1–A3, and a NAND gate NA1.

Figure 3A:
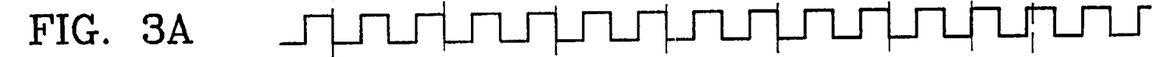
FIGS. 3A–3O are operational timing diagrams of the first data processing unit shown in FIG. 2.
Figure 3B:
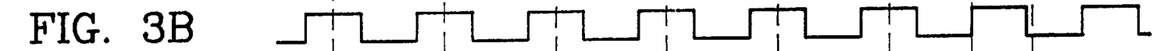
Figures 3C, 3D:
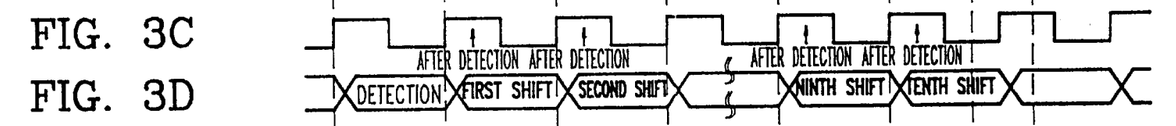
Figure 3E:
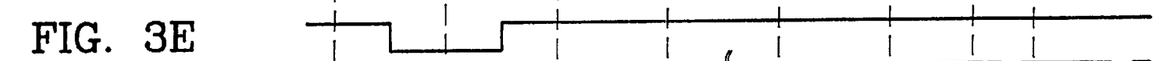
Figure 3F:
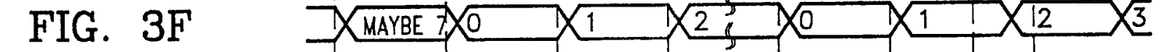
Figure 3G:
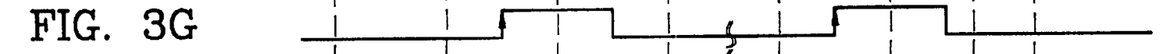
Figure 3H:
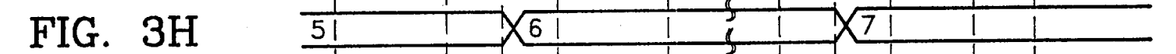
Figure 3I:
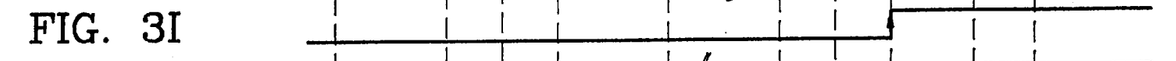
Figure 3J:
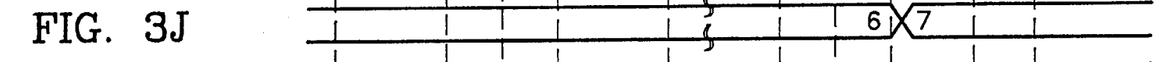
Figure 3K:
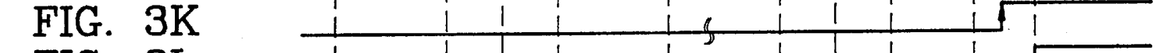
Figure 3L:
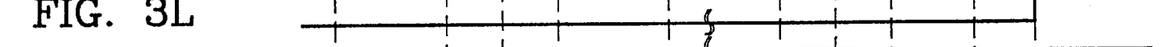
Figure 3M:
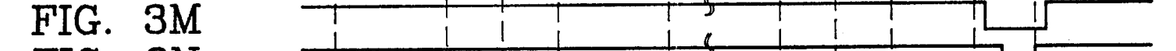
Figures 3N, 3O:
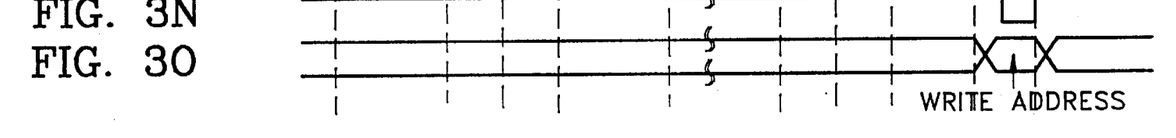

FIGS. 3A–3O are operational timing diagrams of the first data processing unit shown in FIG. 2, for the instance in which 8-bit data is written to internal memory unit 15. FIGS. 3A–3C illustrate signals CLK 40, CLK 20 and SCK, respectively. FIG. 3D illustrates the output of 24-bit shift register 21, FIG. 3E illustrates a reset signal of first counter 23, which is output from a terminal $\overline{Q}$ of first D-flip flop D1, FIG. 3F illustrates the output of first counter 23, FIG. 3G illustrates the result of latching "0", that is, the binary value "000", from among the output values of first counter 23, in second decoder 24 at a falling edge of signal SCK, FIG. 3H illustrates the output of second counter 26, FIG. 3I illustrates the result of latching "7", that is, a binary value "111", from among the output values of second counter 26, in third decoder 27 at a rising edge of signal SCK, FIG. 3J illustrates a clock signal of third counter 28, FIG. 3K illustrates a signal output from a terminal Q of fourth D-flip flop D4, FIG. 3L illustrates a signal output from a terminal $\overline{Q}$ of fifth D-flip flop D5, FIG. 3M illustrates a signal RW output from first NAND gate NA1, FIG. 3N illustrates a signal WCE output from third AND gate A3, and FIG. 3O illustrates a write address WADDR output from third counter 28.

Figure 4:
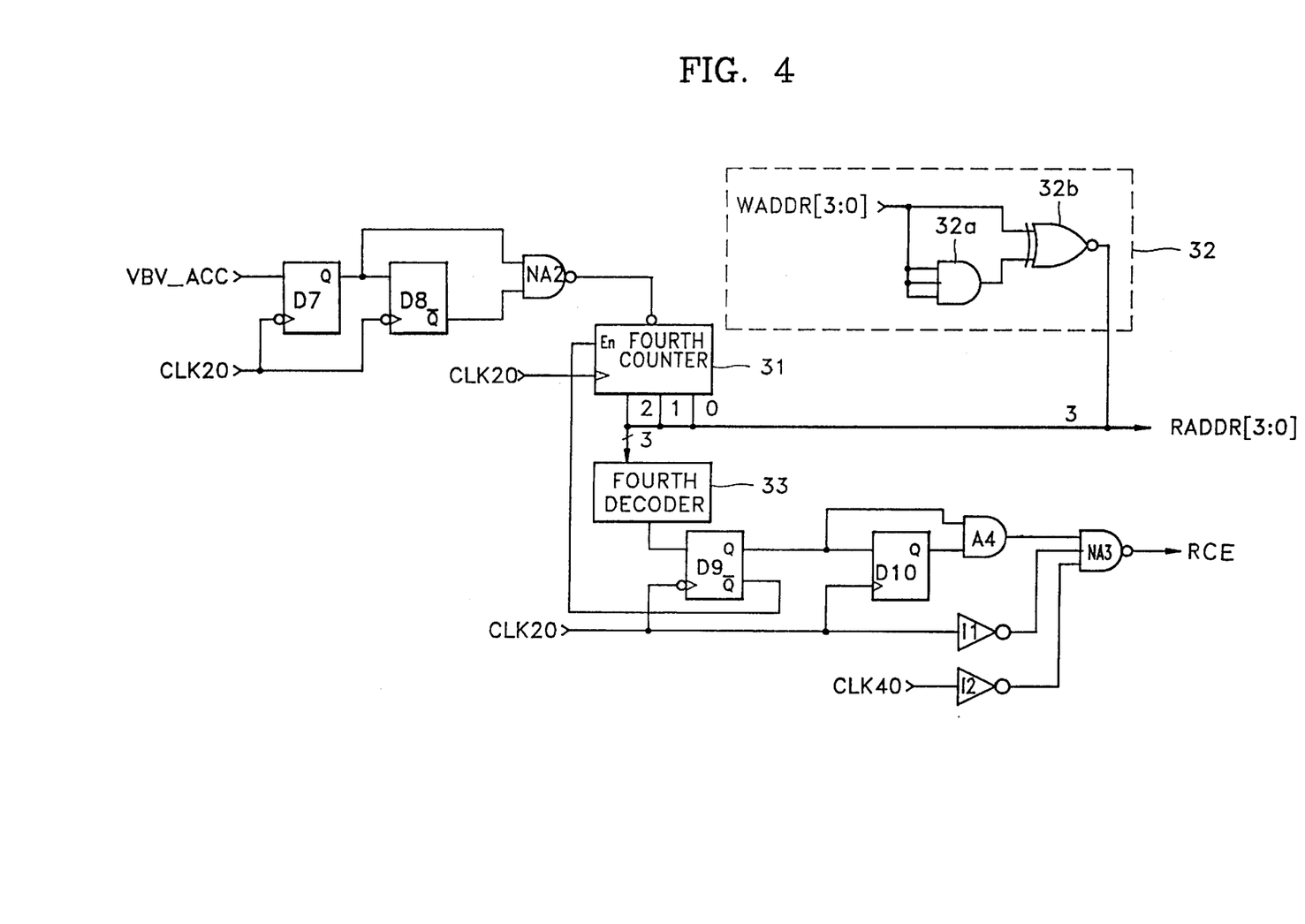
FIG. 4 is a detailed circuit diagram of the second data processing unit shown in FIG. 1.

FIG. 4 is a detailed circuit diagram of second data processing unit 13 shown in FIG. 1. As shown, second data processing unit 13 includes a fourth counter 31, an address upper-bit generator 32, a fourth decoder 33, four D-flip flops D7–D10, two NAND gates PAD and NA3, an AND gate A4, and two inverters 11 and 12. Here, address upper-bit generator 32 includes an AND gate 32a and an exclusive NOR (XNOR) gate 32b.

Figure 5A:
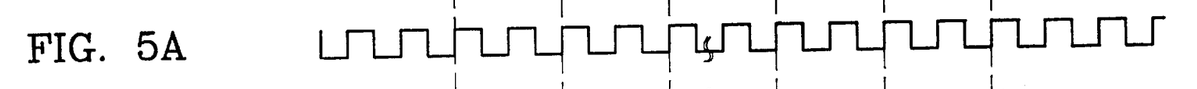
Figure 5B:
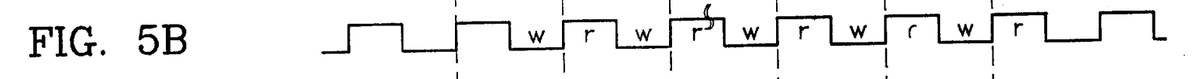
Figure 5C:
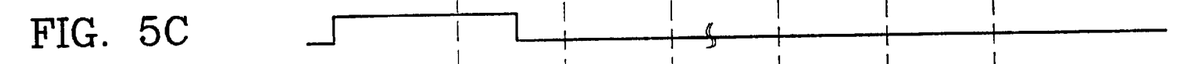
Figure 5D:
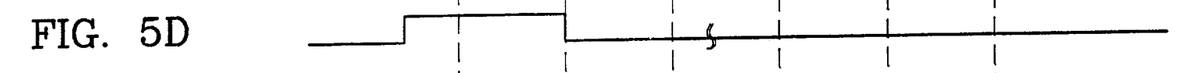
Figure 5E:
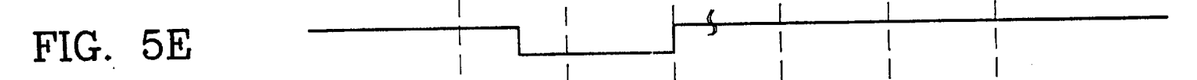
Figure 5F:
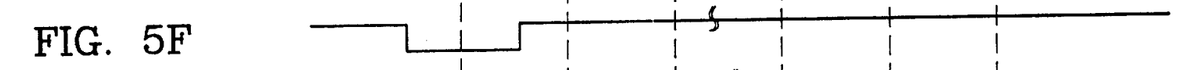
Figure 5G:
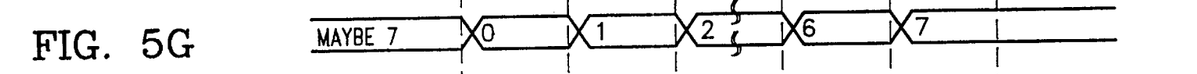
Figure 5H:
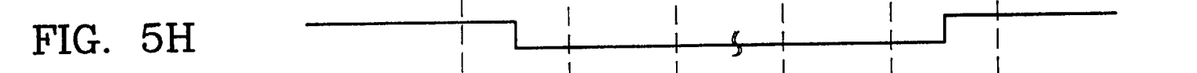
Figure 5I:
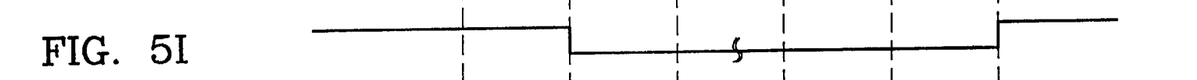
Figure 5J:
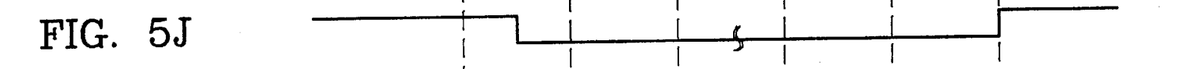
Figure 5K:
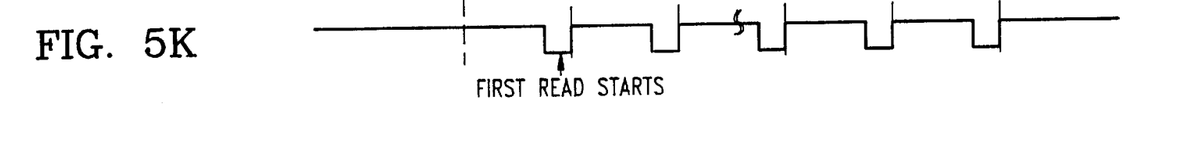

FIGS. 5A–5K are operational timing diagrams of second data processing unit 13 of FIG. 1 and shown in detail in FIG. 4. FIGS. 5A–5C illustrate signals CLK 40, CLK 20, and VBV—ACC, respectively. FIG. 5D illustrates a signal output from a terminal Q of seventh D-flip flop D7, FIG. 5E illustrates a signal output from a terminal $\overline{Q}$ of eighth D-flip flop D8, FIG. 5F illustrates the output of second NAND gate PAD, FIG. 5G illustrates the output of fourth counter 31, FIG. 5H illustrates a signal output from a terminal Q of ninth D-flip flop D9, FIG. 5I illustrates a signal output from a terminal Q of tenth D-flip flop D10, FIG. 5J illustrates the output of fourth AND gate A4, and FIG. 5K illustrates a signal RCE output from third NAND gate NA3.

Figure 6:
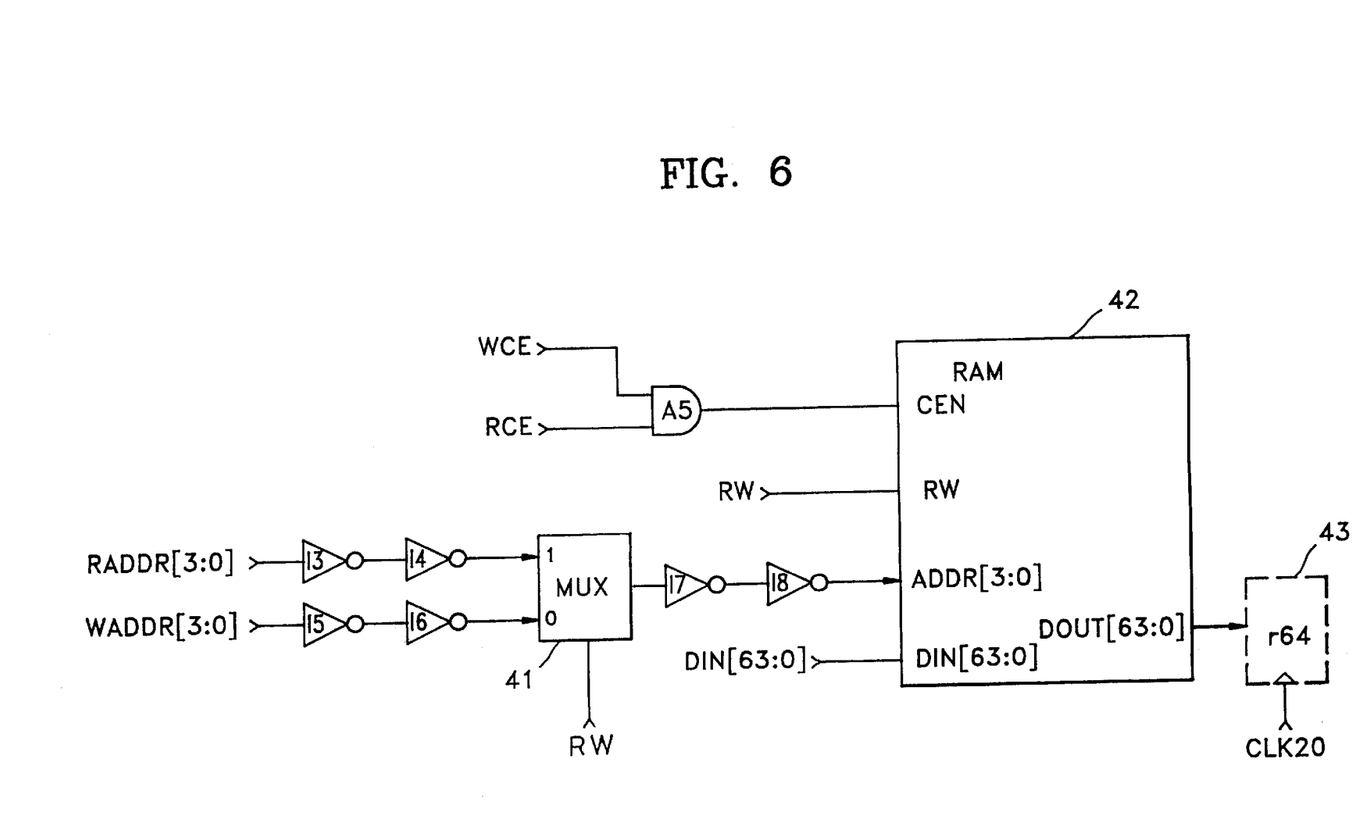
FIG. 6 is a detailed circuit diagram of the memory unit shown in FIG. 1.

FIG. 6 is a detailed circuit diagram of internal memory unit 15 shown in FIG. 1. As shown, internal memory unit 15 includes six inverters 13–18, a fifth AND gate A5, a multiplexer 41, and a memory 42. Here, a 64-bit shift register 43 is provided to shift the 64-bit data output from memory 42.

Figure 7A:
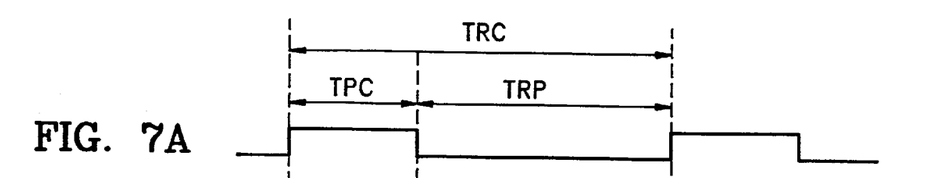
Figure 7B:
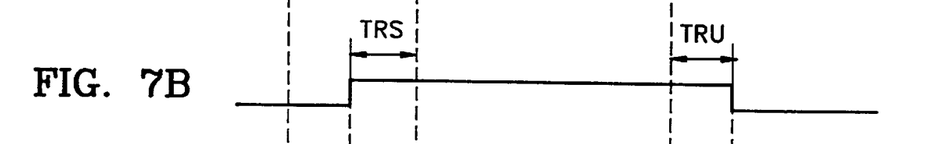
Figure 7C:
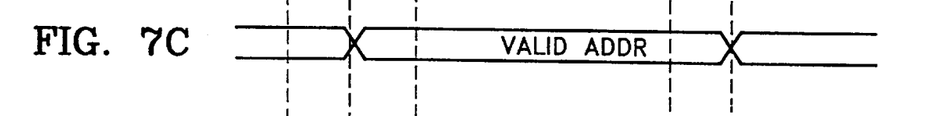
Figure 7D:
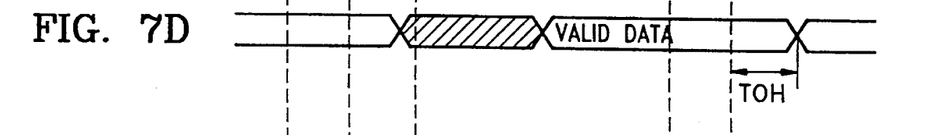
Figure 7E:
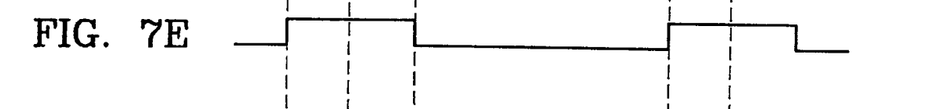
Figure 7F:
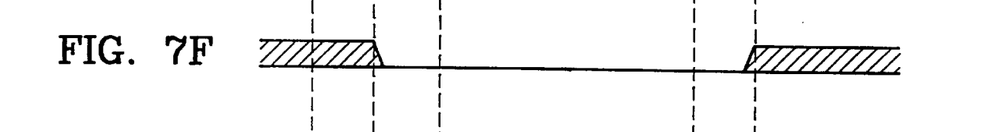
Figure 7G:
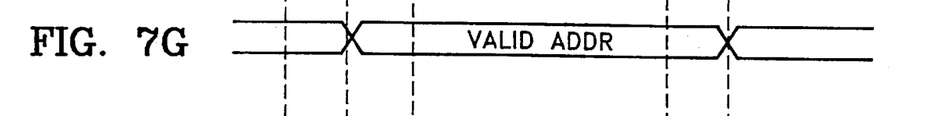
Figure 7H:
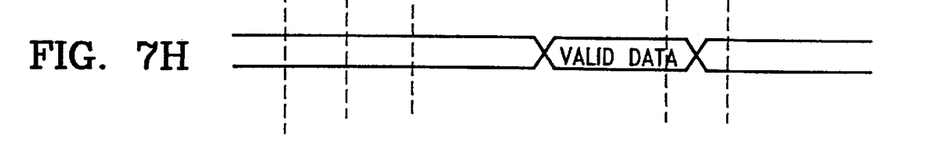

FIGS. 7A–7H are operational timing diagrams of memory unit 15 of FIG. 1 which is shown in detail in FIG. 6. Here, FIGS. 7A–7D illustrate a read cycle. FIG. 7A illustrates a chip enable signal CEN in an active "low" state, in which the label "TRP" denotes a read or write portion of the cycle, and the label "TPC" denotes a pre-charge portion of the cycle. FIG. 7B illustrates a read/write control signal RW, FIG. 7C illustrates an address ADDR, and FIG. 7D illustrates a data read out DOUT data signal from memory 42. On the other hand, FIGS. 7E–7H illustrate a write cycle. FIG. 7E illustrates chip enable signal CEN in an active "low" state, FIG. 7F illustrates read/write signal RW, FIG. 7G illustrates address ADDR, and FIG. 7H illustrates a data in DIN data signal written in memory 42. Here, when read/write control signal RW is "low" while chip enable signal CEN is "low" in the write cycle, data is made valid at a rising edge of chip enable signal CEN.

The operation and effects of the present invention are described below referring to FIGS. 1–7.

The present invention relates to an image recovering apparatus which receives a bit stream, encoded by an image compressing apparatus, at a rate of about 20Mbits per second, and converts this received bit stream to recover an originally transmitted video signal. The image recovering apparatus performs the recovery operation through a VLD (not shown), an inverse-quantizer (not shown), and an inverse-discrete cosine transformer (not shown), in which first data processing unit 11 detects a start code from the input serial bit stream and performs a byte-alignment operation depending on the detected start code. First data processing unit 11 simultaneously packs the bit stream into a 64-bit unit and generates a write address for each unit of packed data to store the packed data unit in internal memory unit 15. Here, when the number of packed data units stored in internal memory unit 15 exceeds a predetermined threshold value (for example, 8 units of packed data, i.e. 8×64bits corresponding to half the capacity of a 16×64bit memory unit 15), a request signal is generated to transmit the stored packed data unit to an external memory (not shown) in a high-speed page mode.

Here, the operation of first data processing unit 11 is described below in more detail, referring to FIGS. 2 and 3.

In 24-bit shift register 21 shown in FIG. 2, a signal $\overline{HOLD}$ having a "low" value indicates that a variable-length serial decoded bit stream SERIAL-IN is valid, while a "high" value of signal $\overline{HOLD}$ indicates that the variable-length decoded serial bit stream SERIAL-IN is invalid. In the former case, the variable-length decoded serial bit stream is converted into parallel data, using signal SCK shown in FIG. 3C as a clock signal, and then output.

First decoder 22 decodes the start code output from 24-bit shift register 21 as the parallel data, as shown in FIG. 3D, and outputs the decoded start code to first counter 23 via first D-flip flop D1. Here, first decoder 22 decodes the sequence "0000 0000 0000 0000 0000 0001" in the case of a signal transmitted in a MPEG-2 format. The start code decoded in first decoder 22 is latched in first D-flip flop D1 according to an inverted SCK signal, and output to terminal $\overline{Q}$.

First counter 23 is a 3-bit counter for performing a byte-alignment operation, and is reset by a signal shown in FIG. 3E which is output from first D-flip flop D1. First counter 23 outputs a count value as shown in FIG. 3F, using signal SCK shown in FIG. 3C as a clock signal. This count value shown in FIG. 3F is applied via second decoder 24, second D-flip flop D2, and first buffer B1 to clock terminals of eight 8-bit shift registers 25a–25h, and to a clock terminal of second counter 26. Here, as shown in FIG. 3G, every time a "0" value, that is, a binary value "000", is decoded by second decoder 24 at a falling edge of signal SCK shown in FIG. 3C, the least significant 8 bits of the 24-bit parallel data output from 24-bit shift register 21 are applied to eight 8-bit shift registers 25a–25h, respectively. Here, 64-bits of data output from eight shift registers 25a–25h becomes data signal DIN[63:0] written to memory 42 which is shown in FIG.6.

On the other hand, when the least significant 8 bits are input to the eight 8-bit shift registers 25a–25h, the count value of second counter 26 acting as a packing counter is incremented by "1". Thus, second counter 26 counts from "000" to "111".

Third decoder 27 decodes a value of "7", that is, a binary value "111", from among the count values output from second counter 26, and outputs a signal as shown in FIG. 3I. Third D-flip flop D3 latches the decoded value output from third decoder 27 according to signal SCK shown in FIG. 3C and applies the latched value to a clock terminal of third counter 28 via terminal Q of D3. On the other hand, a signal output from terminal $\overline{Q}$ of third D-flip flop D3 is latched in fourth D-flip flop D4 by signal CLK 20 shown in FIG. 3B and is then output to first AND gate A1, fifth D-flip flop D5, and first NAND gate NA 1 via terminal Q of fourth D-flip flop D4, respectively.

Third counter 28 acting as a write address counter counts a signal output from terminal Q of third D-flip flop D3, which is applied to a clock terminal of third counter 28, and outputs write address WADDR[3:0] which is incremented by "1" for each 64-bit data unit, as shown in FIG. 3H. That is, when the least significant eight bits are collected in each of eight 8-bit shift registers 25a–25h, write address WADDR is incremented by "1".

If write address WADDR output from third counter 28 is "7", that is, a binary value "111", or "15", that is, a binary value "1110", a write request signal VWR is generated by fourth D-flip flop D4, fifth D-flip flop D5, first AND gate A1, second AND gate A2, and sixth D-flip flop D6. Here, write request signal VWR is generated in pulses at a falling edge of signal CLK 20 shown in FIG. 3B.

On the other hand, read/write control signal RW is generated by fifth D-flip flop D5 and first NAND gate NA1, as shown in FIG. 3M. As shown in FIG. 3N, a write chip enable signal WCE is generated by third AND gate A3. Here, when read/write control signal RW is "high", RW is classified as a read signal, and when RW is "low", RW is classified as a write signal.

That is, as shown in FIG. 2, the variable-length decoded bit stream, which is received by first data processing unit 11, is packed into a 64-bit data unit, and a request signal VWR for 8 of the packed data units is generated. Here, since an accept signal is not generated at a fixed time after generation of the request signal, the time required to generate the accept signal must be set longest, regardless of other request signals. In the present invention, time taken from generation of the request signal to generation of the accept signal is set as a clock time for 8×8×8bits. This time can be changed by modifying the size of internal memory unit 15. The request signal VWR generated in first data processing unit 11 is input to a memory controller (not shown), in which an accept signal VBV—ACC is generated in response to this request signal at a predetermined point in time and is applied to second data processing unit 13.

Second data processing unit 13 is described below, referring to FIGS. 4 and 5.

In FIG. 4, when accept signal VBV—ACC, which is shown in FIG. 5C, is generated in response to the request signal VWR, accept signal VBV—ACC is latched in seventh D-flip flop D7 by signal CLK 20 shown in FIG. 5B, and output from terminal Q of seventh D-flip flop D7 as shown in FIG. 5D. The output signal of seventh D-flip flop D7 is latched again in eighth D-flip flop D8 by signal CLK 20 shown in FIG. 5B, and output from terminal Q of eighth D-flip flop D8 as shown in FIG. 5E. Second NAND gate PAD performs a NAND operation on the output signal of seventh D-flip flop D7 shown in FIG. 5D and the output signal of eighth D-flip flop D8 shown in FIG. 5E to output the signal shown in FIG.5F, which is applied to fourth counter 31.

Fourth counter 31 generates a read address RADDR[3:0], and is reset by the output signal of second NAND gate PAD. It counts signal CLK 20 shown in FIG. 5B and outputs read address RADDR as shown in FIG. 5G. Here, read address RADDR must be a value within the range 0–7 or 8–15, in order to avoid the portion of internal memory unit 15 in which data is being written.

Address upper bit generator 32, by using AND gate 32a and exclusive-NOR (XNOR) gate 32b, generates an address upper bit in order to avoid an overlap of a read bank and a write bank in memory unit 15. That is, when write address WADDR is located in the range 7–14, data corresponding to read address 0–7 is read out, and when write address WADDR is equal to 15 or within the range 0–6, data corresponding to a read address between 8–15 is read out. That is, the address upper-bit generator 32 generates the upper-bit (here, MSB) of the read address RADDR according to the write address WADDR such that accesses to the read and write banks of memory 42 do not overlap, by using AND gate 32a and XNOR gate 32b. For example, when each of the write addresses WADDR are "0111", "1000". . . "1101", "1110", the MSB of the read address RADDR corresponding to each of the write addresses WADDR becomes "0". Accordingly, the read addresses RADDR corresponding to each of the write addresses WADDR "0111", "1000". . ., "1101", "1110" becomes "0000", "0001", . . ., "0 110", "0111", respectively. Meanwhile, when each of the write addresses WADDR are "1111", "0000", . . ., "0101", "0110", the MSB of the read addresses RADDR corresponding to each of the write addresses WADDR becomes "1". Accordingly, the read addresses RADDR corresponding to each of the write addresses WADDR "1111", "0000". . . "0101", "0111" becomes "1000", "1001", . . . "1110", "1111", respectively. Therefore overlapping of the read and write banks in memory 42 is avoided.

Fourth decoder 33 decodes the value "7", that is, a binary value "111," from among the count values of fourth counter 31. The output signal of fourth decoder 33 is latched by ninth D-flip flop D9 at a falling edge of signal CLK 20 shown in FIG. 5B, and output from terminal Q as a shown in FIG. 5H. The output signal shown in FIG. 5H of ninth D-flip flop D9 is latched at a rising edge of signal CLK 20 shown in FIG. 5B by tenth D-flip flop D10, and output as the signal shown in FIG. 5I. Fourth AND gate A4 performs an AND operation on the output signal of ninth D-flip flop D9 shown in FIG. 5H and the output signal of tenth D-flip flop D10 shown in FIG. 5I, and outputs a signal as shown in FIG. 5J. Third NAND gate NA3 performs a NAND operation on the output signal from fourth AND gate A4 shown in FIG. 5J, the output signal from first inverter 11, and the output signal from second inverter 12, and generates a read chip enable signal RCE shown in FIG. 5K.

As described above, second data processing unit 13 generates read address RADDR for reading out eight 64-bit data units from memory unit 15 at a rate of the CLK 20 signal, when an accept signal is generated, and applies the read address RADDR to memory unit 15. Then, the eight data units stored in the corresponding read addresses are read out of memory unit 15.

Here, since the amount of time between a request and an accept is generally not determined, the operation of packing an input bit stream in a 64-bit data unit and writing it to memory unit 15, generating a request signal, and reading out 8 packed data units from memory unit 15 according to an accept signal, must be continuously performed. Here, data can be packed into a 32 bit data unit, 128 bit data unit, or other sized data unit, and data can be read out from memory unit 15 in packed data unit sizes of 16 or 128 bits.

Internal memory unit 15 is shown in detail in FIG. 6 and includes memory 42 having a data input port DIN, a data output port DOUT, a common address port ADDR, and a read/write selection port RW. Memory unit 15 as described above can be easily modified for operation with the present invention.

Write chip enable signal WCE output from first data processing unit 11 and read chip enable signal RCE output from second data processing unit 13 are input to a fifth AND gate A5 upon which an AND operation is performed, and the output signal of fifth AND gate A5 is applied to a chip enable terminal CEN of memory 42. Memory 42 does not operate when chip enable signal CEN is "high", while it selects and operates when chip enable signal CEN is "low". When read/write control signal RW is "high", a read operation is performed, and when read/write control signal RW is "low", a write operation is performed, in memory 42.

Meanwhile, read address RADDR[3:0] output from first data processing unit 11 is delayed by third and fourth inverters 13 and 14, and then applied to multiplexer 41. Write address WADDR[3:0] output from second data processing unit 13 is delayed by fifth and sixth inverters 15 and 16, and applied to multiplexer 41. Multiplexer 41 selects either of write address WADDR[3:0] and read address RADDR[3:0] which are delayed, according to read/write control signal RW, and applies the selected address to address port ADDR[3:0] via seventh and eighth inverters 17 and 18.

Then, memory 42 writes data applied to data input port DIN[63:0] or outputs stored data to 64-bit shift register 43 through output port DOUT[63:0], according to the address applied to address port ADDR[3:0].

In the present invention, data is packed in units of 64 bits and a request signal is generated for 8 units of packed data. However, this is an exemplification, and thus the particular parameters described herein can be modified according to the size of memory unit 15 or other applications. Further, CLK 20 and CLK 40 are set as 20MHz and 40MHz, for convenience's sake, and thus, can be changed to other values. Here, CLK 20 is generated by dividing the frequency of CLK 40 by two, and thus, the frequency of CLK 40 must be twice that of CLK 20.

The present invention can be applied to every kind of hardware which employs a system of defining write and read operations of a memory for storing a variable-length decoded bit stream.

As described above, in a method and a circuit for rearranging output data from a VLD according to the present invention, a variable-length decoded bit stream is packed into units having a predetermined number of bits, and a number of units of such packed data are transmitted to an external memory while in a high-speed page mode by using a request signal and an accept signal. Therefore, the timing margin can be ensured through request and accept signals, and an automatic byte-alignment by start code is possible. Further, the read and write timing of a memory is stabilized, and read and write banks of the memory are efficiently switched during read and write operations.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for rearranging output data of a variable-length decoder (VLD), comprising the steps of:
    (a) packing a variable-length decoded bit stream into a data unit having a predetermined number of bits, generating a write address for the packed data unit, and storing said packed data unit in an internal memory at a location corresponding to said write address;
    (b) generating a request signal for transmitting said stored packed data unit to an external memory when the number of packed data units stored in said internal memory exceeds a predetermined threshold value;
    (c) generating respective read addresses for reading out N packed data units from said internal memory when an accept signal is received in response to said request signal; and
    (d) sequentially reading out from said internal memory said N packed data units stored at said read addresses in said internal memory, and transmitting said read out packed data units to said external memory.

2. A method for rearranging output data of a VLD, as claimed in claim 1, wherein said predetermined number of data bits of said data unit is 64 and said predetermined threshold value of said internal memory equals ½ the capacity of said internal memory.

3. A circuit for rearranging output data of a variable-length decoder (VLD), comprising:
    an internal memory;
    a first data processor for packing a variable-length decoded bit stream into a data unit having a predetermined number of bits, generating a write address for said packed data unit and storing said packed data unit in said internal memory at a location corresponding to said write address, and generating a request signal for transmitting said stored packed data unit to an external memory when the number of packed data units stored in said internal memory exceeds a predetermined threshold value; and
    a second data processor for generating respective read addresses for reading out N packed data units from said internal memory when an accept signal is received in response to said request signal, and applying the generated read address to said internal memory, wherein said N packed data units stored at locations corresponding to said read addresses are sequentially read out from said internal memory and transmitted to said external memory.

4. A circuit for rearranging output data of a VLD as claimed in claim 3, wherein said first data processing unit detects a start code from said variable-length decoded bit stream and performs a byte-alignment operation based on said detected start code.

5. A circuit for rearranging output data of a VLD as claimed in claim 3, wherein said predetermined number of bits of said packed data unit equals 64.

6. A circuit for rearranging output data of a VLD as claimed in claim 4, wherein said predetermined threshold value is ½ of the capacity of said internal memory.

7. A circuit for rearranging output data of a VLD as claimed in claim 6, wherein said first data processing unit comprises:
   a first shift register for converting said variable-length decoded bit stream into parallel data;
   a first decoder for decoding said start code from said parallel data output from said first shift register;
   a first counter for performing a byte-aligning operation, after being reset based on said start code, depending on said start code decoded by said first decoder;
   a second decoder for decoding a first value among the output values of said first counter;
   a plurality of second shift registers for receiving least significant bits among said parallel data output from said first shift register, whenever said first value is decoded by said second decoder;
   a second counter for counting when said first value is decoded by said second decoder;
   a third decoder for decoding a second value from among the output values of said second counter;
   a third counter for increasing and outputting said write address whenever said least significant bits from said first shift register are collected in said plurality of second shift registers as indicated by an output of said third decoder;
   a request signal generator for generating a request signal when said write address output from said third counter is one of a third and fourth value;
   a read/write control signal generator for generating a read/write control signal according to the decoding result of said third decoder and a first clock signal; and
   a write chip enable signal generator for generating a write chip enable signal according to said read/write control signal and a second clock signal.

8. A circuit for rearranging output data of a VLD as claimed in claim 7, wherein said first shift register is a 24-bit shift register for shifting 24 bits of data of said variable-length decoded bit stream.

9. A circuit for rearranging output data of a VLD as claimed in claim 7, wherein said plurality of second shift registers is comprised of eight 8-bit shift registers.

10. A circuit for rearranging output data of a VLD as claimed in claim 7, wherein said first value is "0", said second value is "7", said third value is "7" and said fourth value is "15".

11. A circuit for rearranging output data of a VLD as claimed in claim 7, wherein said first clock signal is generated by frequency-dividing said second clock signal by two.

12. A circuit for rearranging output data of a VLD as claimed in claim 6, wherein said second data processing unit comprises:
   a counter for generating a read signal for reading out said eight 64-bit data units from said internal memory, when said accept signal is generated;
   an address upper bit generator for generating an address upper bit to avoid the overlap of a read bank and a write bank in said internal memory;
   a decoder for decoding a predetermined value from among the output values of said counter; and
   a read chip enable signal generator for generating a read enable signal from the decoding result of said decoder, a first clock signal, and a second clock signal.

13. A circuit for rearranging output data of a VLD as claimed in claim 3, wherein said predetermined threshold value equals "7".

14. A circuit for rearranging output data of a VLD as claimed in claim 12, wherein said first clock signal is generated by frequency-dividing said second clock signal by two.

* * * * *